(12) United States Patent
Minagawa (10) Patent No.: US 6,510,318 B1
(45) Date of Patent: Jan. 21, 2003

(54) METHOD FOR LOCATION REGISTRATION OF MOBILE STATIONS IN A MOBILE COMMUNICATIONS SYSTEM

(75) Inventor: Fumihiko Minagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/362,119

(22) Filed: Jul. 28, 1999

(30) Foreign Application Priority Data

Jul. 28, 1998 (JP) .......................................... 10-226599

(51) Int. Cl.⁷ ................................................ H04R 7/20
(52) U.S. Cl. ...................... 455/435; 455/434; 455/433; 455/456
(58) Field of Search ................................ 455/435, 434, 455/456, 433, 432, 458

(56) References Cited

U.S. PATENT DOCUMENTS

| | | | | |
|---|---|---|---|---|
| 5,212,822 A | * | 5/1993 | Fukumine et al. | 455/443 |
| 5,361,396 A | * | 11/1994 | Onoe et al. | 455/435 |
| 5,379,451 A | * | 1/1995 | Nakagoshi et al. | 455/435 |
| 5,442,684 A | * | 8/1995 | Hashimoto et al. | 455/456 |
| 5,566,358 A | * | 10/1996 | Obayashi et al. | 455/435 |
| 5,613,199 A | * | 3/1997 | Yahagi | 455/435 |
| 5,787,349 A | * | 7/1998 | Taketsugu | 455/435 |
| 6,223,038 B1 | * | 4/2001 | Iseyama et al. | 455/435 |
| 6,275,706 B1 | * | 8/2001 | Rune | 455/456 |

FOREIGN PATENT DOCUMENTS

| | | |
|---|---|---|
| JP | 8-205228 | 8/1996 |
| JP | 9-018938 | 1/1997 |

* cited by examiner

*Primary Examiner*—Edward F. Urban
*Assistant Examiner*—Tilahun Gesesse
(74) *Attorney, Agent, or Firm*—Foley & Lardner (57) ABSTRACT

A location registration control method reducing the traffic for location registration is disclosed in a mobile communications system having the capability of changing a configuration of location registration areas. When receiving a broadcast channel when moving into another radio zone, a mobile station compares a previous location code with a current location code. If they matches, then the mobile station receives an incoming call notification channel from the current base station without making a location registration request. If they do not match, the mobile station makes a location registration request through the current base station.

8 Claims, 8 Drawing Sheets

LOCATION REGISTRATION AREA RESTRUCTURING CONTROL

LRA : LOCATION REGISTRATION AREA
LC : LOCATION CODE
RZ : RADIO ZONE
ZC : ZONE CODE

FIG.3

| TIME OF CHANGING OF LOCATION REGISTRATION AREA | ZONE CODE ZC=Z1 | ZONE CODE ZC=Z2 | ZONE CODE ZC=Z3 | ZONE CODE ZC=Z4 |
|---|---|---|---|---|
| t1 | A | A | B | B |
| t2 | A | B | B | B |
| t3 | A | A | A | B |

FIG.4A

| MOBILE STATION | ZONE CODE OF RADIO ZONE WHERE A LOCATION REGISTRATION REQUEST IS RECEIVED | TIME OF ACCEPTANCE OF LOCATION REGISTRATION |
|---|---|---|
| MS31 | Z1 | t31 |
| MS32 | Z1 | t32 |
| MS33 | Z3 | t33 |

FIG.4B

| MOBILE STATION | ZONE CODE OF RADIO ZONE WHERE A LOCATION REGISTRATION REQUEST IS RECEIVED | TIME OF ACCEPTANCE OF LOCATION REGISTRATION |
|---|---|---|
| MS31 | Z1 | t31 |
| MS32 | Z1 | t32 |
| MS33 | Z2 | t34 |

METHOD FOR LOCATION REGISTRATION OF MOBILE STATIONS IN A MOBILE COMMUNICATIONS SYSTEM

BACKGROUND OF THE INVENTION

1. Field of the Invention

The present invention relates to a location registration control method implemented in a mobile communications system. More particularly, this invention relates to a location registration control method utilizing variable location registration areas.

2. Description of the Related Art

Location registration control is needed in a mobile communications system. A mobile station makes location registration in a location registration area including a plurality of radio zones, one of which the mobile station is located in. When an incoming call addressed to the mobile station occurs, a selective calling signal is transmitted to the mobile station located within the radio zone belonging to the location registration area in which the mobile station has made the location registration.

To suppress an increase in the frequency of occurrence of a location registration request (a traffic for location registration), there has been proposed a location registration method utilizing variable location registration areas that are controlled so that the size thereof varies depending on a situation (see Japanese Unexamined Patent Publication No. 8-205228).

More specifically, during some of time zones in a day, many mobile stations are put in use. During such a time zone, a location registration request signal is transmitted frequently. However, the frequency of transmitting the location registration request signal must be made as small as possible even during the time zone. For this reason, it is necessary to widen the range of one location registration area. By contrast, during some time zones, mobile stations do not move very largely but dwell in the same radio zone. During such a less-movement time zone, it is required that the range of one location registration area must be narrowed so that paging can be achieved readily and reliably at the time of incoming call occurrence. Even when the range of one location registration area is narrow, if the mobile stations move a little, then it is unnecessary to care about an increase in the traffic for location registration.

The location registration method disclosed in the Japanese Unexamined Patent Publication No. 8-205228 is a technique based on the foregoing idea. However, when the arrangement of the location registration areas is changed, a larger number of mobile stations must have their location registrations corrected. This poses a problem in that the traffic for location registration increases abruptly.

To solve the above problem, a location registration control method has been proposed in efforts (see Japanese Unexamined Patent Publication No. 9-18938). According to this conventional control method, each base station transmits a location registration area conditional expression and location registration area information to the mobile stations located therein. The location registration area conditional expression gives a condition that must be satisfied by each radio zone belonging to a location registration area. The location registration area information is given to each radio base station. A mobile station stores information of a radio zone (registration zone) in which the mobile station has made a location registration, that is, identification information of the radio zone. Unless a relationship between the registration zone information and the location registration area information satisfies the location registration area conditional expression, the mobile station is judged to have left the location registration area in which the mobile station has made a location registration. Therefore, the location registration will be made again.

Accordingly, when location registration areas are restructured, mobile stations satisfying the condition given by the location registration area conditional expression need not modify their location registrations. Consequently, an abrupt increase in the traffic for location registration can be suppressed.

However, according to the technology illustrated in the Japanese Unexamined Patent Publication No. 9-18938, when location registration areas are restructured, some mobile stations cannot satisfy the condition given by the location registration area conditional expression. If many mobile stations cannot satisfy the condition given by the location registration area conditional expression, then the traffic for location registration increases when location registration areas are restructured.

SUMMARY OF THE INVENTION

An object of the present invention is to provide a location registration control method which can dramatically reduce the traffic for location registration.

Another object of the present invention is to provide a location registration control method which eliminates the need for a location registration request of any mobile station at the time when the location registration areas are restructured.

According to the present invention, in a mobile communications system composed of a control station, a plurality of radio base stations each forming a radio zone, and a plurality of mobile stations, the control station changes a combination of radio zones to form a configuration of location registration areas each formed by at least one radio zone. The control station stores a history of changes in the configuration of location registration areas each having a location code assigned thereto in a location registration area table. The control station then transmits a changed location code to a base station included in a location registration area associated with the changed location code.

The base station receiving the changed location code changes a location code of a broadcast channel to the changed location code, and broadcasts the changed location code on the broadcast channel.

A mobile station receives a broadcast channel when the mobile station has moved from a first radio zone of a first base station to a second radio zone of a second base station. When receiving the broadcast channel, the mobile station compares a first location code of the first base station with a second location code of the second base station. When the first location code matches the second location code, the mobile station receives an incoming call notification channel from the second base station without making a location registration request. When the first location code does not match the second location code, the mobile station makes a location registration request through the second base station.

The control station may store a zone identification code of a base station where the mobile station has made a location registration request and a time instant when the location registration request has been made onto a location registration acceptance table. When an incoming call addressed to a certain mobile station occurs, the control station searches the location registration area table and the location registration acceptance table for location codes of location registration areas including a radio zone in which the certain mobile station is currently located. And the control station instructs all base stations associated with the location codes searched for to transmit an incoming call notification signal.

DESCRIPTION OF THE PREFERRED EMBODIMENTS

Figure 1:
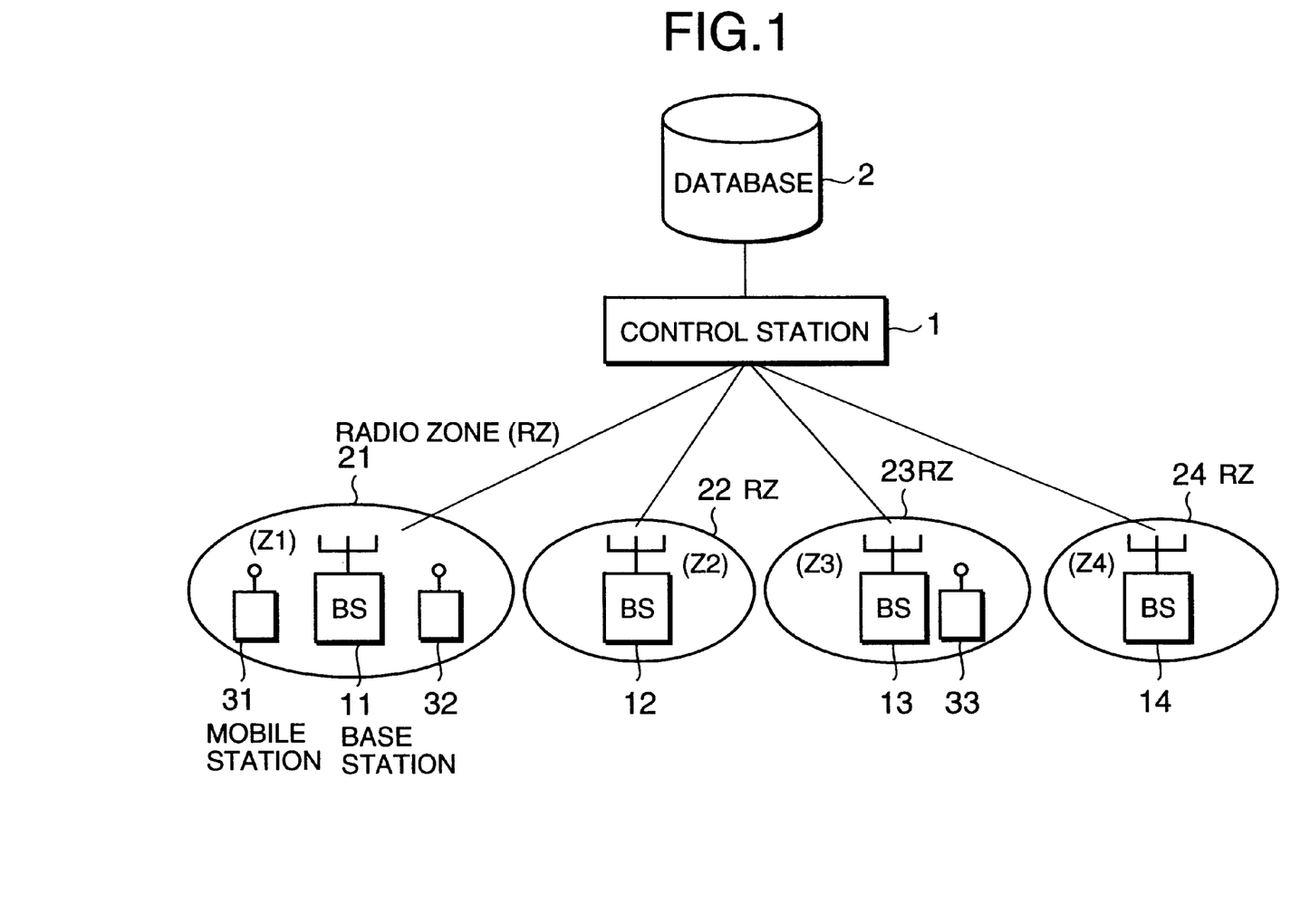
FIG. 1 is a schematic diagram showing a mobile communications system in which a location registration control method according to an embodiment of the present invention is implemented.

Referring to FIG. 1, assuming for simplicity that a mobile communications system connected on a public network includes a control station 1, a database 2, a plurality of radio base stations (BSs) 11, 12, 13, and 14 controlled by the control station 1, and a plurality of mobile stations 31, 32, and 33 which can communicate with a radio base station by radio.

A database 2 utilized by the control station 1 contains a location registration area table (see FIG. 3) and a location registration acceptance table (see FIGS. 4A and 4b), which will be described later.

The respective radio base stations 11, 12, 13 and 14 form radio zones 21, 22, 23, and 24. Identification codes (hereinafter referred to as zone codes) Z1, Z2, Z3, and Z4 are assigned to the radio zones 21, 22, 23, and 24, respectively. In the illustrated example, the mobile stations 31 and 32 are located in the radio zone 21, while the mobile station 33 is located in the radio zone 23.

In the mobile communications system described above, the control station 1 can change the coverage for location registration as will be described hereinafter.

Figure 2:
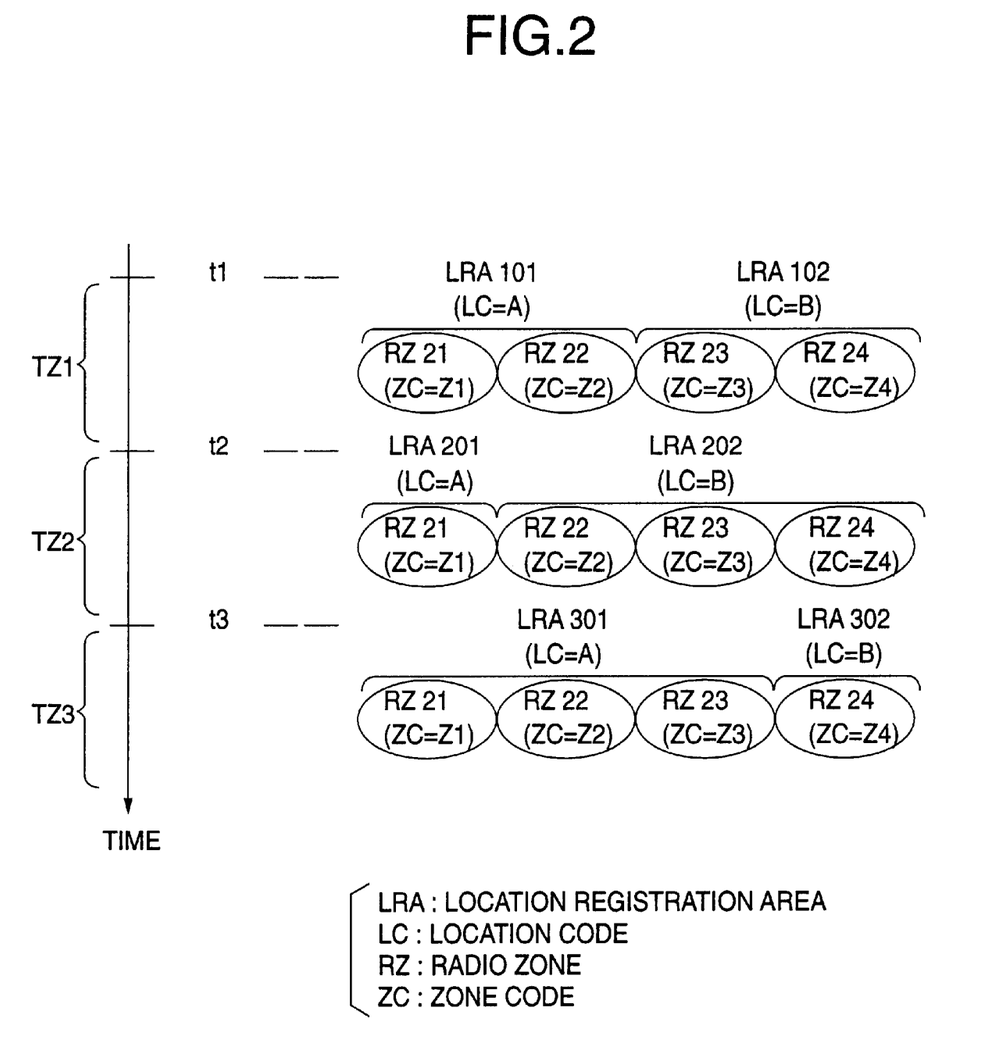
FIG. 2 is a sequence diagram showing an example of the restructuring operation of location registration areas according to the embodiment.

Referring to FIG. 2, the radio zones formed by all the radio base stations are divided into a plurality of groups each forming a location registration area under control of the control station 1. A combination of the radio zones is varied according to traffic volume attained during a time of day. In FIG. 2, the location registration areas are restructured at the time instants t1, t2, and t3.

More specifically, in the time zone TZ1 from the time instant t1 to t2, a location registration area consists of a location registration area 101 (location code LC=A) including the radio zones 21 and 22 and a location registration area 102 (location code LC=B) including the radio zones 23 and 24.

In the subsequent time zone TZ2 from t2 to t3, a location registration area consists of a location registration area 201 (location code LC=A) including the radio zone 21 and a location registration area 202 (location code LC=B) consists of the radio zones 22, 23, and 24.

In the next time zone TZ3 from t3, a location registration area consists of a location registration area 301 (location code LC=A) including the radio zones 21, 22, and 23 and a location registration area 302 (location code LC=B) including the radio zone 24.

Figure 3:
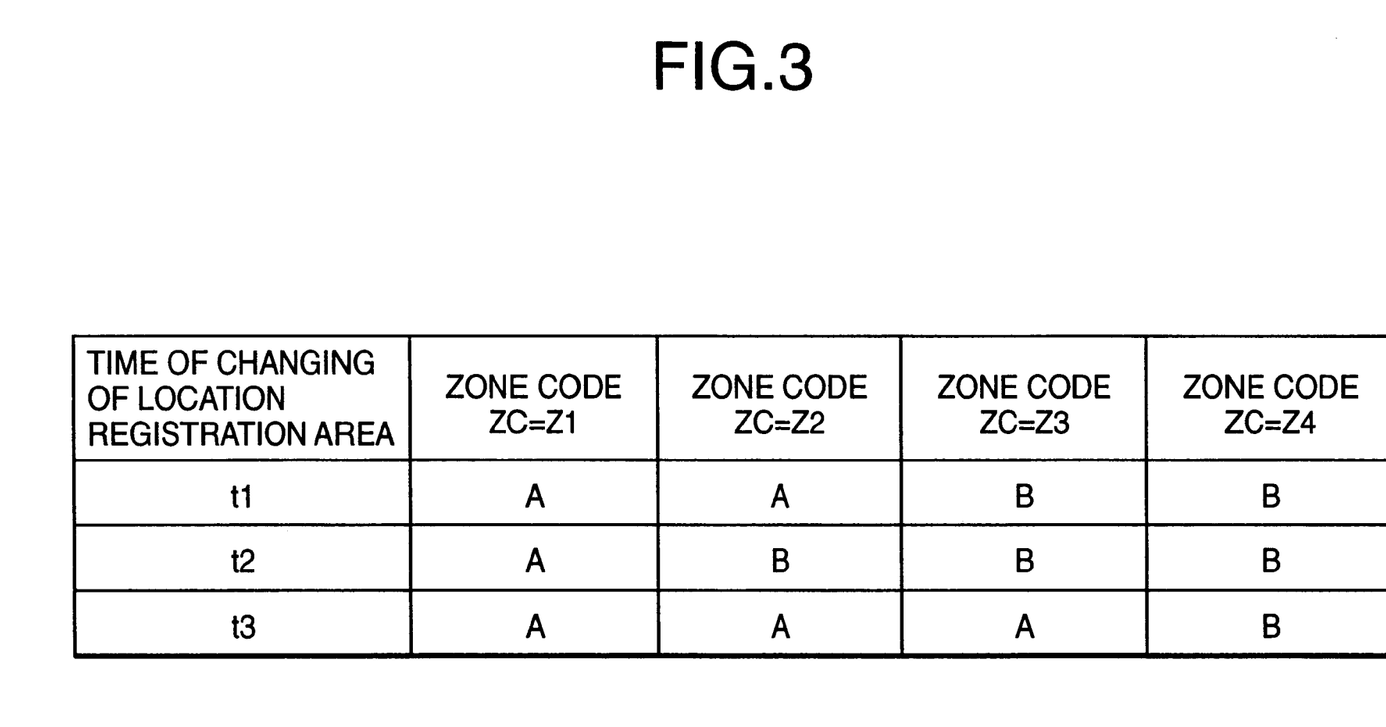
FIG. 3 is a diagram showing an example of a location registration area table employed in the embodiment.

Referring to FIG. 3, the location registration area table is stored in the database 2, which associates a radio zone (zone code) with a location registration area (location code) in relation to a location registration area restructuring time instant. In short, the location registration area table gives the history of transition of location registration areas.

In the illustrated example, at time instant t1, the coverage of the location registration areas is changed to a state of the time zone TZ1 as shown in FIG. 2. At time instant t2, it is changed to a state of the time zone TZ2 as shown in FIG. 2. At time instant t3, it is changed to a state of the time zone TZ3 as shown in FIG. 2.

Figure 4A:
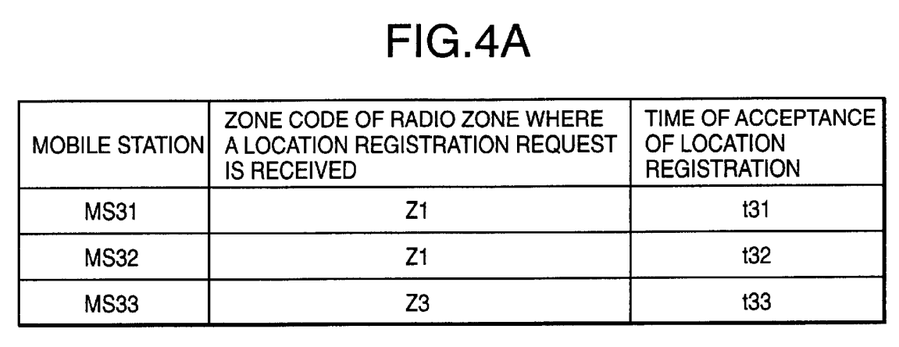
FIG. 4A is a diagram showing an example of a location registration acceptance table.
Figure 4B:
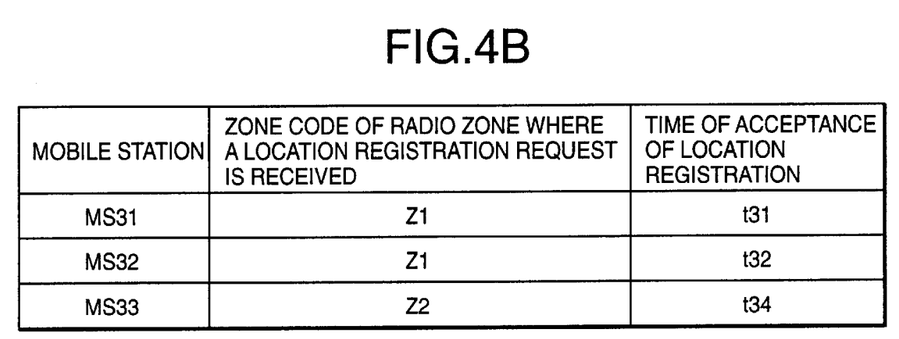
FIG. 4B is a diagram showing the location registration acceptance table of FIG. 4A in the case where a certain mobile station enters another radio zone.

Referring to FIGS. 4A and 4B, the location registration acceptance table is stored in the database 2, which associates a mobile station with a radio zone (zone code), in which the mobile station has made a location registration, in relation to a location registration acceptance time instant. In short, the location registration acceptance table gives the history of location registrations made by each mobile station.

More specifically, as shown in FIG. 4A, the mobile station 31 makes a location registration request in the radio zone 21 (zone code Z1) and the request is accepted at the time instant t31. The acceptance time t31 and the radio zone code Z1 for the mobile station 32 are stored in the location registration acceptance table of the database 2. Similarly, the mobile station 32 mates a location registration request in the radio zone 21 (zone code Z1) and the request is accepted at the time instant t32. The mobile station 33 makes a location registration request in the radio zone 23 (zone code Z3) and the request is accepted at the time instant t33.

As shown in FIG. 4B, when the mobile station 33 has moved from the radio zone 23 (zone code Z3) to the radio zone 22 (zone code Z2), the mobile station 33 needs location registration in the radio zone 22. Therefore, the mobile station 33 makes a location registration request in the radio zone 22 and the request is accepted at the time instant t34. This causes the location registration acceptance table to be updated as shown in FIG. 4B.

As shown in FIGS. 4A and 4B, no location code is written in the location registration acceptance table. The location registration acceptance table is therefore filled in irrespective of whether location registration areas are restructured.

Figure 5:
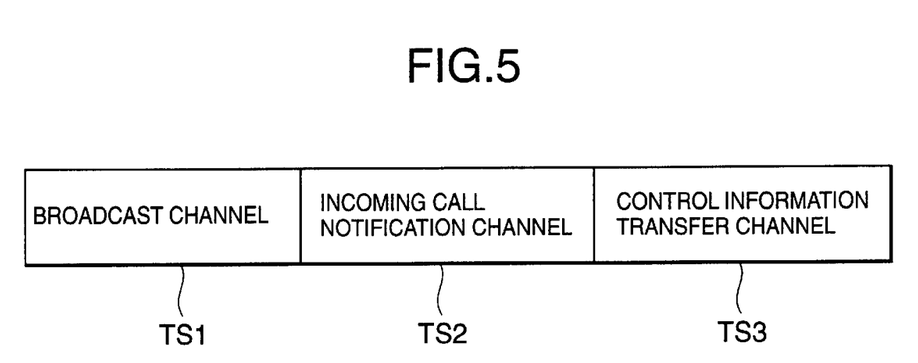
FIG. 5 is a diagram showing the format of a down control channel over which a radio base station transmits control data.

Referring to FIG. 5, a down control channel is used to transmit data from a radio base station to a mobile station located in the radio zone thereof. In this embodiment, the down control channel is divided into time slots TS1, TS2, and TS3 to which a broadcast channel, an incoming call notification channel, and a control information transfer channel are allocated, respectively.

The broadcast channel of time slot TS1 is used to broadcast the location code of each radio base station to mobile stations located in the radio zone of the radio base station. When a mobile station has moves into adjacent radio zone or when powered on in the radio zone of a radio base station, the mobile station can receive information over the broadcast channel from the base station.

The incoming call notification channel of time slot TS2 is used to transmit information including a destination mobile station and, if necessary, further including a broadcast channel reception instruction. This is because information other than a location code may be transmitted over the broadcast channel. A mobile station in a standby status receives the incoming call notification channel. If the incoming call notification channel does not include a broadcast channel reception instruction, the mobile station receives the incoming call notification channel alone.

Next, a location registration control method according to the embodiment will be illustrated with reference to FIG. 6 to FIG. 9.

To begin with, the operation to be performed for restructuring location registration areas will be illustrated with reference to FIG. 6.

Figure 6:
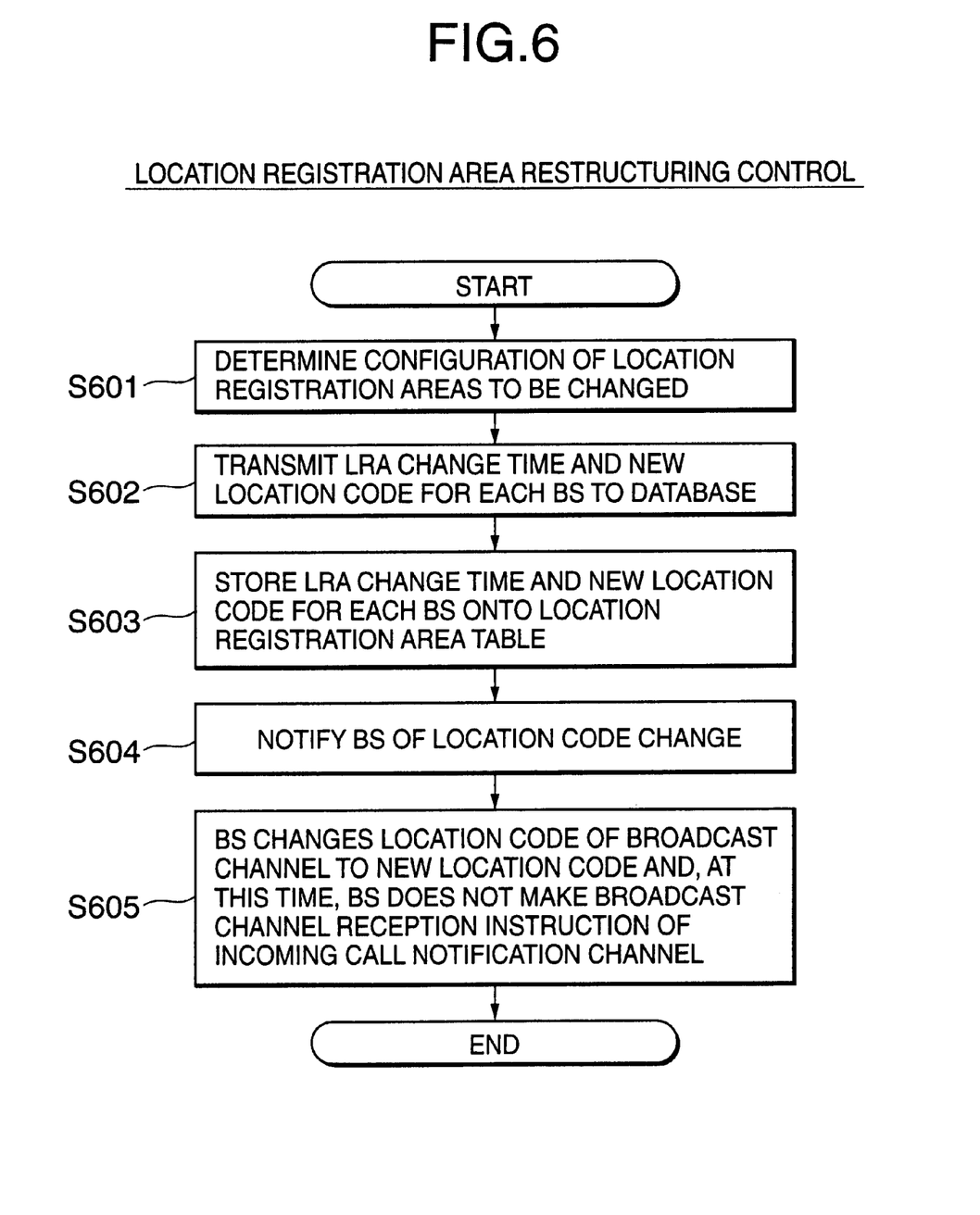
FIG. 6 is a flow chart showing an operation for restructuring location registration areas.

Referring to FIG. 6, to restructure location registration areas at time instant t1 as shown in FIG. 2, the control station 1 determines configuration of location registration areas to be restructured (step S601).

The control station 1 sends the location registration change time t1 and a new location code for each radio base station to the database 2 (step S602).

The location registration change time t1 and the new location code for each radio base station are added to the location registration area table of the database 2 as shown in FIG. 3 (stop S603).

Subsequently, the control station 1 notifies the radio base stations that their location codes should be modified of the location code modification by transmitting new location codes as information elements to the corresponding radio base stations (step S604).

When receiving the information elements from the control station 1, each of the corresponding radio base stations changes the location code of the broadcast channel to the new location code. At this time, no broadcast channel reception instruction is mode in the incoming call notification channel. Therefore, it is not reported to the mobile stations that location registration areas have been restructured.

At location registration change time instants tz and t3, location registration areas are restructured as shown in FIG. 2. Consequently, as shown in FIG. 3, information is added to the location registration area table in association with the time instants.

Figure 7:
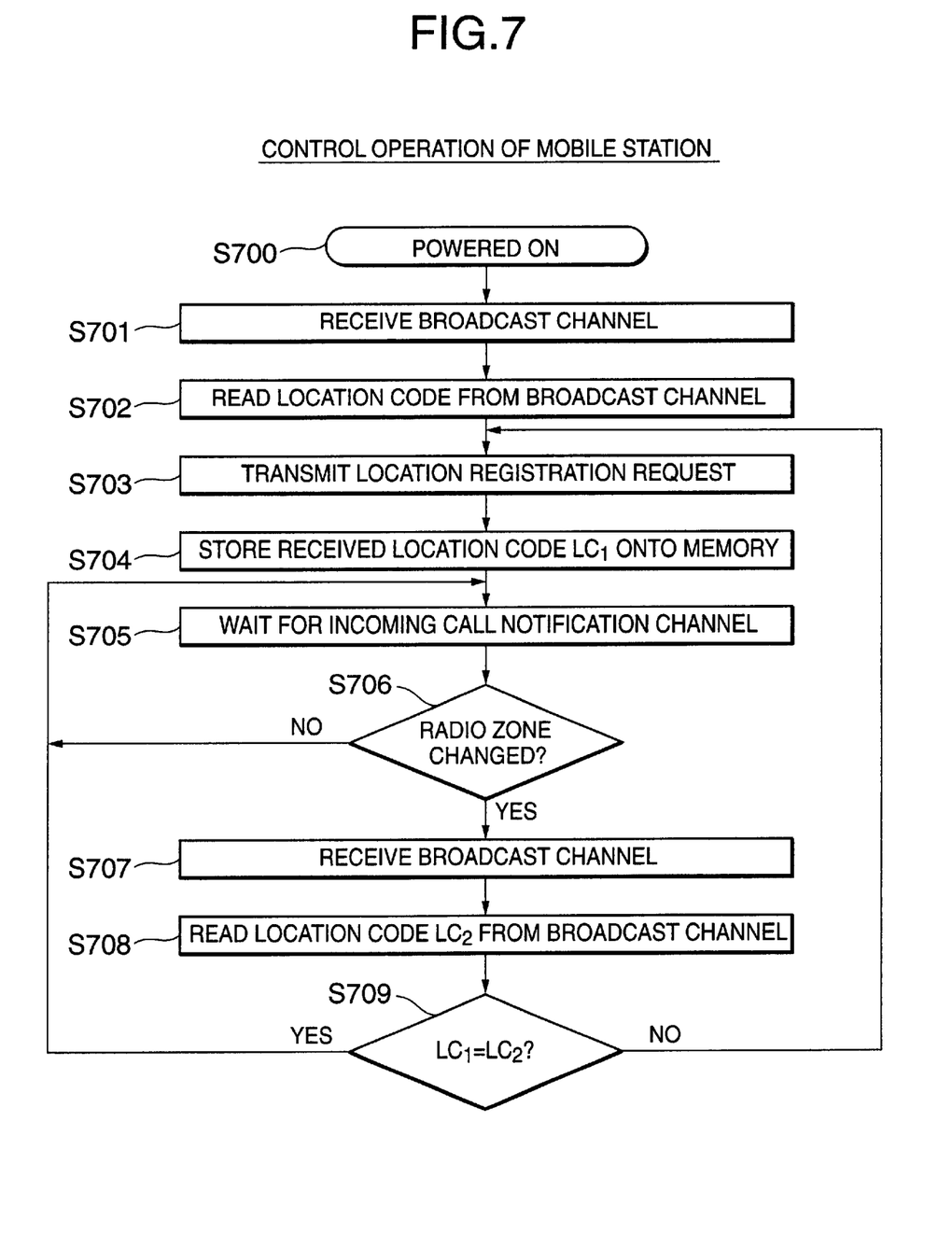
FIG. 7 Is a flow chart showing an operation for making a location registration by a mobile station.

Referring to FIG. 7, a mobile station is powered on (stop S700) and receives the broadcast channel in the current radio zone to recognize the location code assigned to the current radio base station (steps S701 and S702).

Thereafter, the mobile station makes a location registration request (step S703), stores the location code (step S704), and then the mobile station enters a standby state (step S705). In the standby state, the mobile station receives the incoming call notification channel alone. Unless otherwise instructed, the mobile station does not receive the broadcast channel.

When the mobile station moves and enters another radio zone (YES in step S706), the mobile station receives the broadcast channel in the current radio zone (step S707) and reads a location code of the current radio base station from the broadcast channel (step S708).

Thereafter, the mobile station checks if the stored location code LC, of the previous radio base station matches the currently received location code $LC_2$ of the current radio base station (step S709).

When it is found at the step S709 that the stored location code $LC_1$ matches the currently received location code $LC_2$ (YES in step S709), a location registration area to which the current radio zone belongs is the same as that to which the previous radio zone belongs. Therefore, the control goes back to the step S705 without making a location registration request.

On the other hand, when it is found at the step S709 that the stored location code $LC_1$ does not match the currently received location code $LC_2$ (NO in step S709), a location registration area to which the current radio zone belongs is different from that to which the previous radio zone belongs. Therefore, the control is returned to the step S703 where a location registration request is made.

Figure 8:
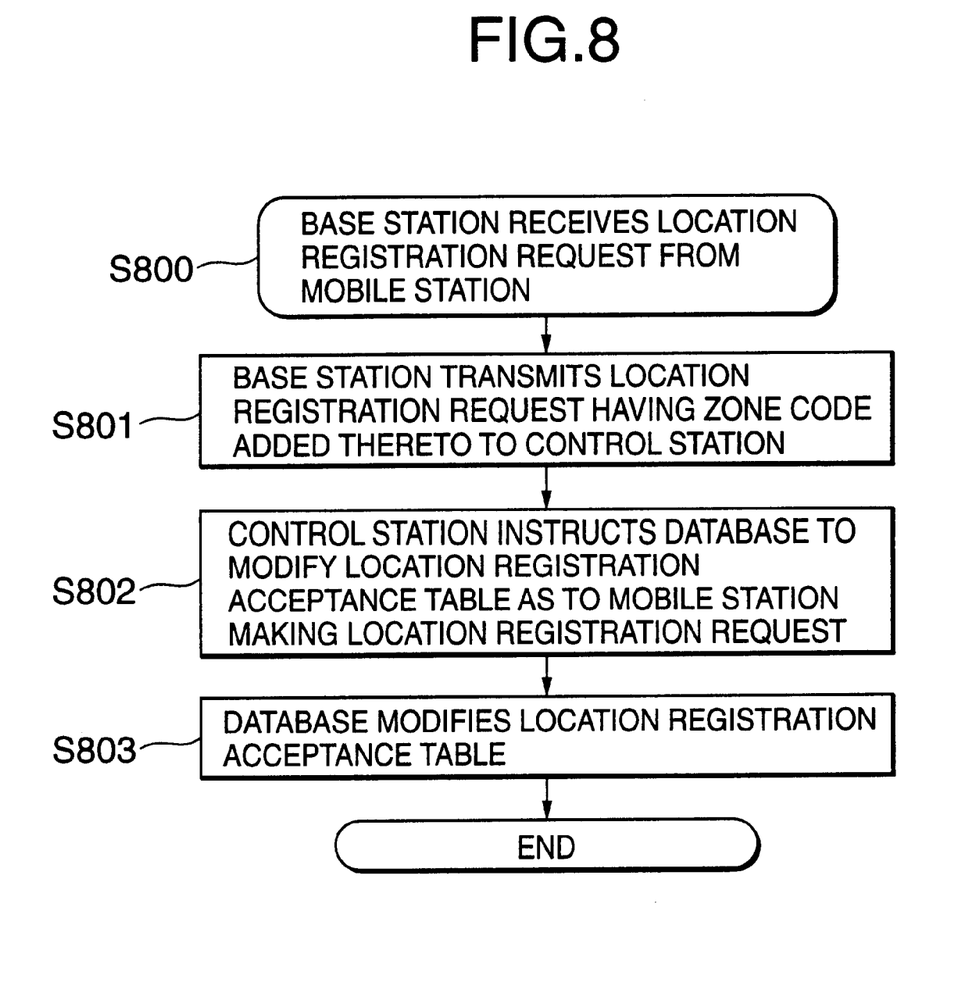
FIG. 8 is a flow chart showing an operation for handling a location registration in response to a location registration request received from a mobile station.

Referring to FIG. 8, when a radio base station receives the location registration request from a mobile station (step S800), the radio base station transmits the location registration request having the zone code added thereto to the control station 1 (S801). For example, as shown in FIGS. 4A and 4B, the radio base station 11 adds the zone code Z1 to the location registration request sent from the mobile stations 31 and 32 and notifies the resultant location registration requests of the control station 1. Further, the radio base station 13 adds the zone code Z3 to the location registration request sent from the mobile station 33 and notifies the resultant location registration request of the control station 1.

When receiving the location registration requests having zone codes added thereto, the control station 1 instructs the database 2 to modify the items of the location registration acceptance table, which are associated with the mobile stations having made the location registration requests (step S802). For example, in response to the location registration request received from the mobile station 31, the control station 1 supplies the one code Z1 and the acceptance time instant t31 to the database 2 and thus instructs modification of the location registration acceptance table. Similarly, in response to the location registration request received from the mobile station 32, the control station 1 supplies the zone code Z1 and acceptance time instant t32 to the database 2. In response to the location registration request received from the mobile station 33, the control station 1 supplies the zone code Z3 and acceptance time instant t33 to the database 2.

In the above manner, the location registration acceptance table in the database 2 is modified in response to the instructions received from the control station 1 (step S803). Consequently, the location registration acceptance table as shown in FIG. 4A is completed.

Thereafter, radio zones are modified at step S806 in FIG. 8. When the change makes it necessary to make a location registration, the foregoing procedure is repeated in order to modify the items of the location registration acceptance table associated with mobile stations concerned.

For example, assume that the mobile station 33 moves from the radio zone 23 (zone code Z3) to the radio zone 22 (zone code Z2) at time instant t34 between the time instants t2 and t3 shown in FIG. 3. At the time instant t34, the radio zone 22 (zone code Z2) that is the destination of the mobile station 33 and the radio zone 23 (zone code Z3) that is the source thereof belong to the game location registration area to which location code A is assigned.

On the other hand, the location code stored in the mobile station 33 is location code B acquired in the source radio zone 23 (zone code Z3) before the mobile station 33 moves. Consequently, the location codes the mobile station 33 has acquired before and after the movement disagree with each other at step S809 in FIG. 8. The mobile station 33 therefore transmits a location registration request.

In response to the location registration request sent from the mobile station 33, the foregoing steps S900 to S903 are carried out. As a result, the contents of the location registration acceptance table associated with the mobile station 33 are, as shown in FIG. 5, modified into zone code Z2 and acceptance time instant t34.

Next, the operation to be made when an incoming call addressed to a mobile station occurs will be illustrated with reference to FIG. 9.

It is assumed for simplicity that the location registration areas are restructured as the state in the time zone TZ3 of FIG. 2 and the location registration acceptance table is in the latest state as shown in FIG. 4B, that is, indicating that the mobile station 33 was moved into the radio zone 22 (zone code Z2) at the time instant t34. At this time, consider that an incoming call addressed to the mobile station 33 occurs.

Figure 9:
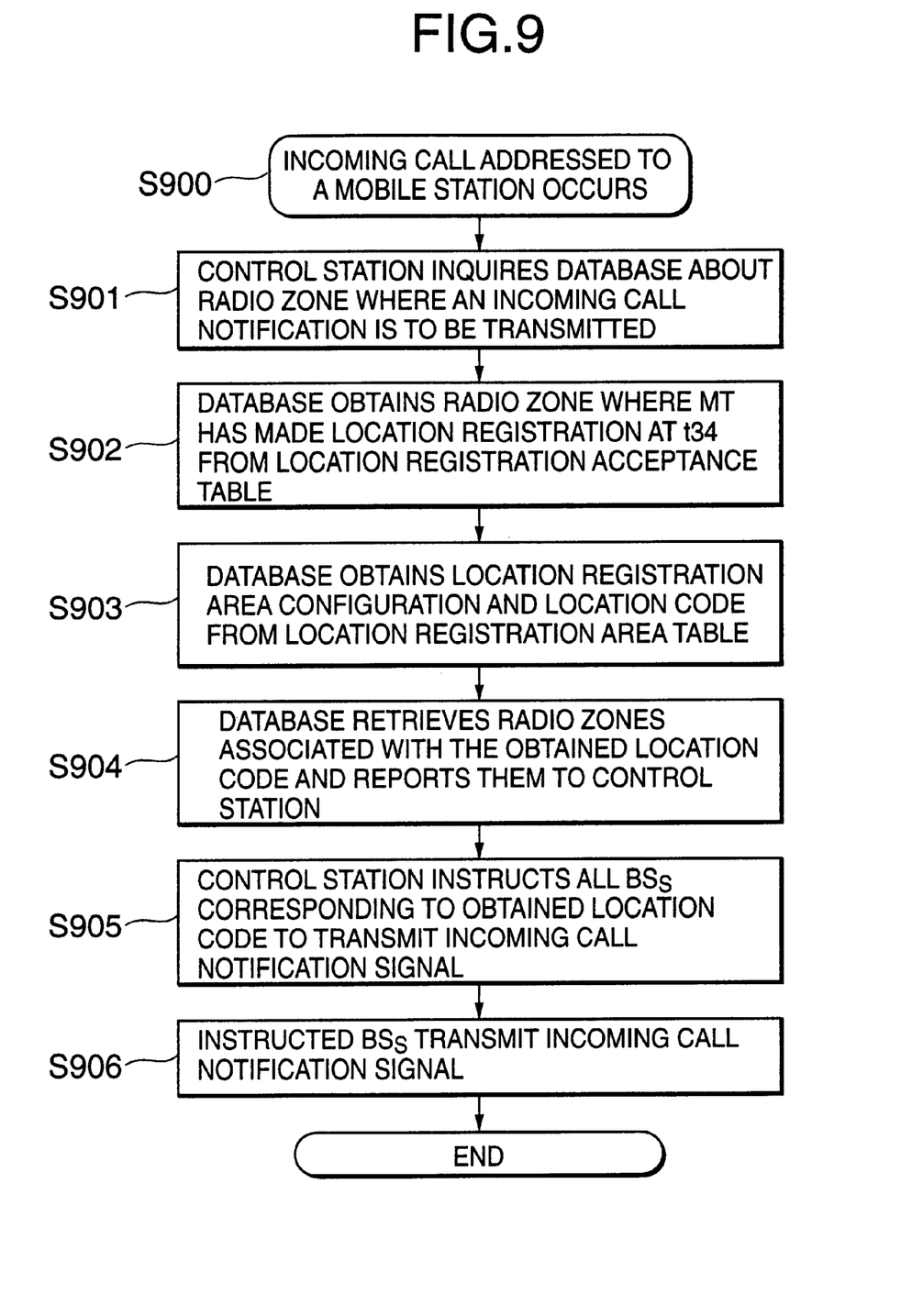
FIG. 9 is a flow chart showing an incoming processing operation when an incoming call addressed to a mobile station occurs.

Referring to FIG. 9, when receiving an incoming call addressed to the mobile station 33 from the public network (step S900), the control station 1 queries the database 2 about a radio zone where an incoming call notification signal should be transmitted to the mobile terminal 33 (step S901).

By searching the location registration acceptance table as shown in FIG. B, the database 2 obtains a radio zone (here, radio zone 22) where the mobile station 33 has made a location registration at the time instant t34 (step (S902).

Thereafter, the database 2 searches the location registration area table as shown in FIG. 3 for a location registration area including the radio zone 22 (zone code Z2) and then obtains the corresponding location code (here, LC=A) and the location registration area configuration when the mobile station 33 has made the location registration as shown in FIG. 3 (step S903).

Further the database 2 searches the location registration area table for radio zones associated with the obtained location code (here, LC=A). In this case, the zone codes Z1, Z2, and Z3 are retrieved and reported to the control station 1 (stop S904).

When receiving the zone codes (here, Z1, Z2, and Z3) from the database 2, the control station 1 instructs all the radio base stations corresponding to the received zone codes (here, 11, 12, and 13), which cover the radio zones associated with the location code A, to transmit the incoming call notification signal (step S905).

All the instructed radio base stations 11, 12, and 13 transmit the incoming call notification signal (step S906). Since the incoming call notification signal is produced in response to an incoming call addressed to the mobile station 33, the incoming call notification signal is received by the mobile station 33.

According to the location registration control method of the present embodiment, it is not notified of a mobile station that location registration areas have been restructured (step S604 in FIG. 6). Only when a mobile station moves to a different zone code, a location registration request signal is transmitted (S703 through S709 in FIG. 7). Therefore, when location registration areas are merely restructured, the necessity of transmitting a location registration request signal does not arise, preventing a traffic for location registration from increasing abruptly.

Moreover, a mobile station may be unaware of a location registration area to which the mobile station belongs. Nevertheless, an incoming call notification signal is transmitted to the mobile station according to the configuration of the location registration areas when the mobile station has made a location registration request. There is therefore no problem.

As described above, according to the present invention, even if location registration areas are restructured, the fact is not notified of mobile stations. Therefore, the mobile stations need not be conscious of whether location registration areas are restructured. Consequently, an abrupt increase in traffic for location registration can be prevented. Moreover, the mobile stations are provided with information of a location registration area including a zone in which each mobile station exists. When a mobile station merely changes a communicating radio zone, the mobile station need not to make a location registration request. From this viewpoint, an increase in the traffic for location registration can be also reduced.

Moreover, a history indicating which radio zone belongs to which location registration area is stored in the location registration area table. Moreover, which mobile station has made a location registration in which radio zone is also stored in the location registration acceptance table. Therefore, when an incoming call addressed to any mobile station occurs, an incoming call notification signal is transmitted in all radio zones belonging to a location registration area in which the mobile station exists.

As long as a location code assigned to a radio base station remains unmodified, the location code to be broadcast to mobile stations need not be modified. The aforesaid procedure can be simplified.

What is claimed is:

1. A control method in a mobile communications system composed of a control station, a plurality of radio base stations each providing a radio zone, and a plurality of mobile stations, wherein the control station changes combinations of radio zones to form configurations of location registration areas each comprising at least one radio zone, the method comprising:

at the control station:
storing in a location registration area table a history of changes in the configuration of location registration areas;
storing in a location registration acceptance table a zone where a mobile station has made a location registration request and a time instant when the location registration request has been made; and
when an incoming call addressed to the mobile station occurs, searching the location registration acceptance table for a current zone of the mobile station, searching the location registration area table for a location registration area of the current zone of the mobile station, and instructing all base stations associated with the location registration area of the current zone of the mobile station to transmit an incoming call notification signal to the mobile station.

2. The control method claimed in claim 1, further comprising:

at the control station,
  transmitting a changed location code to a base station included in a location registration area associated with a changed location code;
at the base station receiving the changed location code:
  changing a location code of a broadcast channel to the changed location code; and
  broadcasting the changed location code on the broadcast channel; and
at the mobile station:
  receiving a broadcast channel of a second base station when the mobile station has moved from a first zone of a first base station to a second zone of the second base station;
  comparing a first location code of the first base station with a second location code of the second base station; and
  making a location registration request through the second base station when the first location code does not match the second location code.

3. A control method according to claim 2, wherein the mobile station receives the broadcast channel in one of cases where powered on and where the mobile station has changed a zone, wherein a location code of the broadcast channel is stored.

4. A control method according to claim 2, wherein the base station transmits an incoming call notification channel without a broadcast channel reception instruction when changing a location code of the broadcast channel to the changed location code.

5. A control method according to claim 2, further comprising:
  at each of the base stations:
    when receiving a location registration request from the mobile station, transmitting the location registration request including a zone of the base station to the control station; and
  at the control station:
    updating the zone of the mobile station in the location registration acceptance table.

6. The control method claimed in claim 2, further comprising:
  at the mobile station:
    receiving an incoming call notification channel from the second base station without making a location registration request when the first location code matches the second location code.

7. In a mobile communications system composed of a control station, a plurality of radio base stations each providing a radio zone, and a plurality of mobile stations, wherein the control station changes combinations of radio zones to form configurations of location registration areas each comprising at least one radio zone, stores in a location registration area table a history of changes in the configuration of location registration areas each having a location code assigned thereto and at least one zone associated therewith, and transmits a changed location code to a base station included in a location registration area associated with the changed location code, and wherein the base station receives the changed location code, changes a location code of a broadcast channel to the changed location code, and broadcasts the changed location code on the broadcast channel, a control method in the control station, comprising:
  storing in a location registration acceptance table a zone of a base station where a mobile station has made a location registration request and a time instant when the location registration request has been made; and
  when an incoming call addressed to the mobile station occurs, searching the location registration acceptance table for a current zone of the mobile station, searching the location registration area table for a location registration area of the current zone of the mobile station, and instructing all base stations associated with the location registration area of the current zone of the mobile station to transmit an incoming call notification signal to the mobile station.

8. A communication control method according to claim 7, wherein the mobile station receives the broadcast channel in one of cases where powered on and where the mobile station has changed a zone, wherein a location code of the broadcast channel is stored.

* * * * *